United States Patent
May

(10) Patent No.: US 7,961,172 B2
(45) Date of Patent: Jun. 14, 2011

(54) DETECTING DEVICE USAGE

(75) Inventor: Alistair Edwin May, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 2107 days.

(21) Appl. No.: 10/620,811

(22) Filed: Jul. 17, 2003

(65) Prior Publication Data

US 2004/0066368 A1 Apr. 8, 2004

(30) Foreign Application Priority Data

Jul. 17, 2002 (GB) .................................. 0216635.3

(51) Int. Cl.
*G09G 5/00* (2006.01)
(52) U.S. Cl. ....................................................... 345/156
(58) Field of Classification Search .......... 345/156–172
See application file for complete search history.

(56) References Cited

U.S. PATENT DOCUMENTS

| 5,854,621 A | 12/1998 | Junod et al. |
| 6,781,570 B1 * | 8/2004 | Arrigo et al. ................... 345/158 |
| 2002/0021278 A1 * | 2/2002 | Hinckley et al. .............. 345/156 |
| 2002/0126094 A1 * | 9/2002 | Junod et al. ................... 345/163 |

FOREIGN PATENT DOCUMENTS

| EP | 0 505 126 A2 | 9/1992 |
| JP | 11224158 | 8/1999 |

* cited by examiner

*Primary Examiner* — Stephen G Sherman
(74) *Attorney, Agent, or Firm* — Novak Druce DeLuca + Quigg LLP

(57) ABSTRACT

A radio-capable device, comprising: a data collection unit for collecting data, and having a normal operating mode in which it is enabled for collecting data and a low-power mode; a radio communication unit for transmitting over a radio channel data collected by the data collection unit; and a radio channel sensor coupled to the radio unit for sensing at least one physical characteristic of the radio channel, and arranged to cause the data collection unit to enter the normal operating mode if the physical characteristic meets a pre-set threshold.

20 Claims, 3 Drawing Sheets

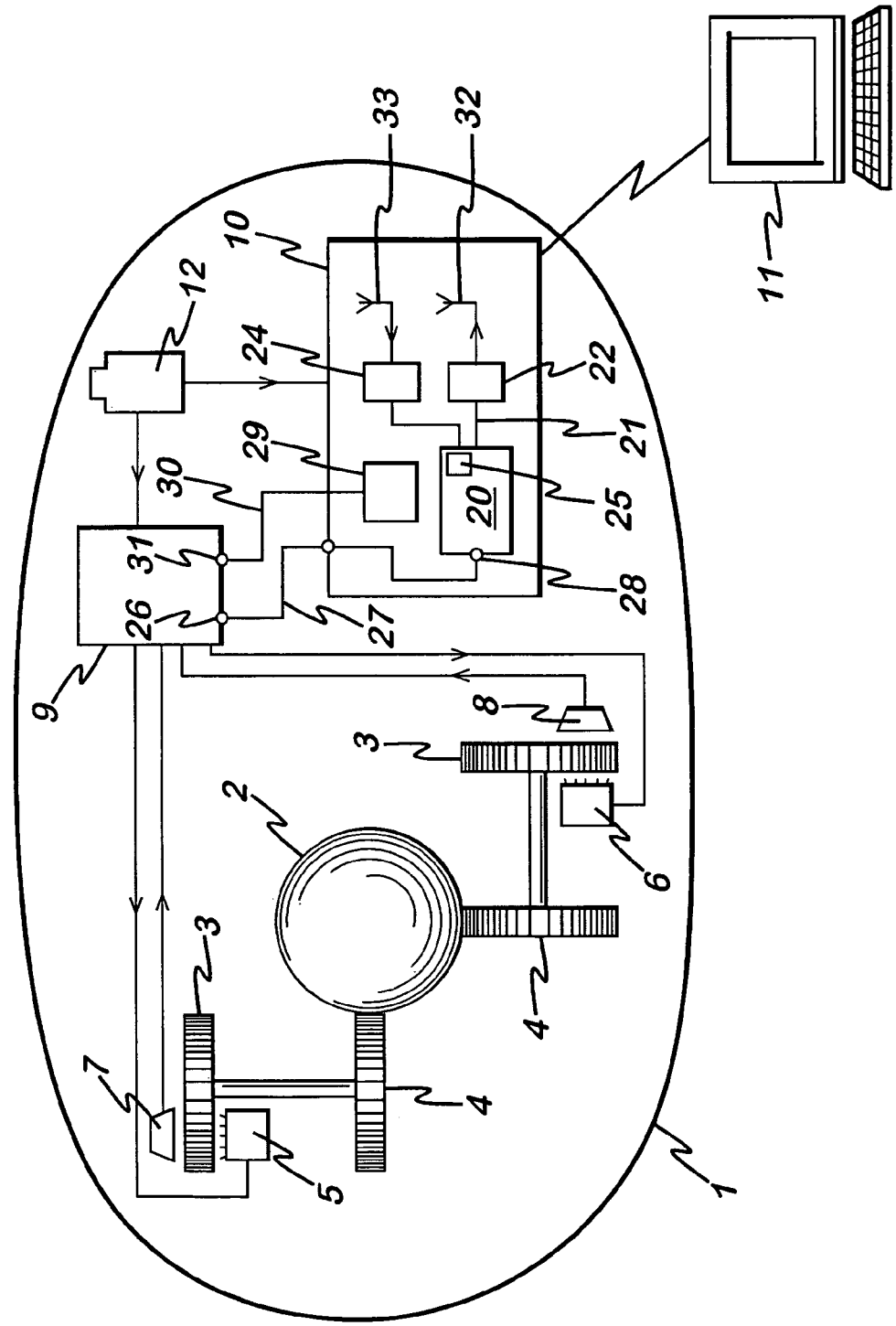

DETECTING DEVICE USAGE

This invention relates to detecting usage of a device, especially a radio-capable device.

Figure 1:
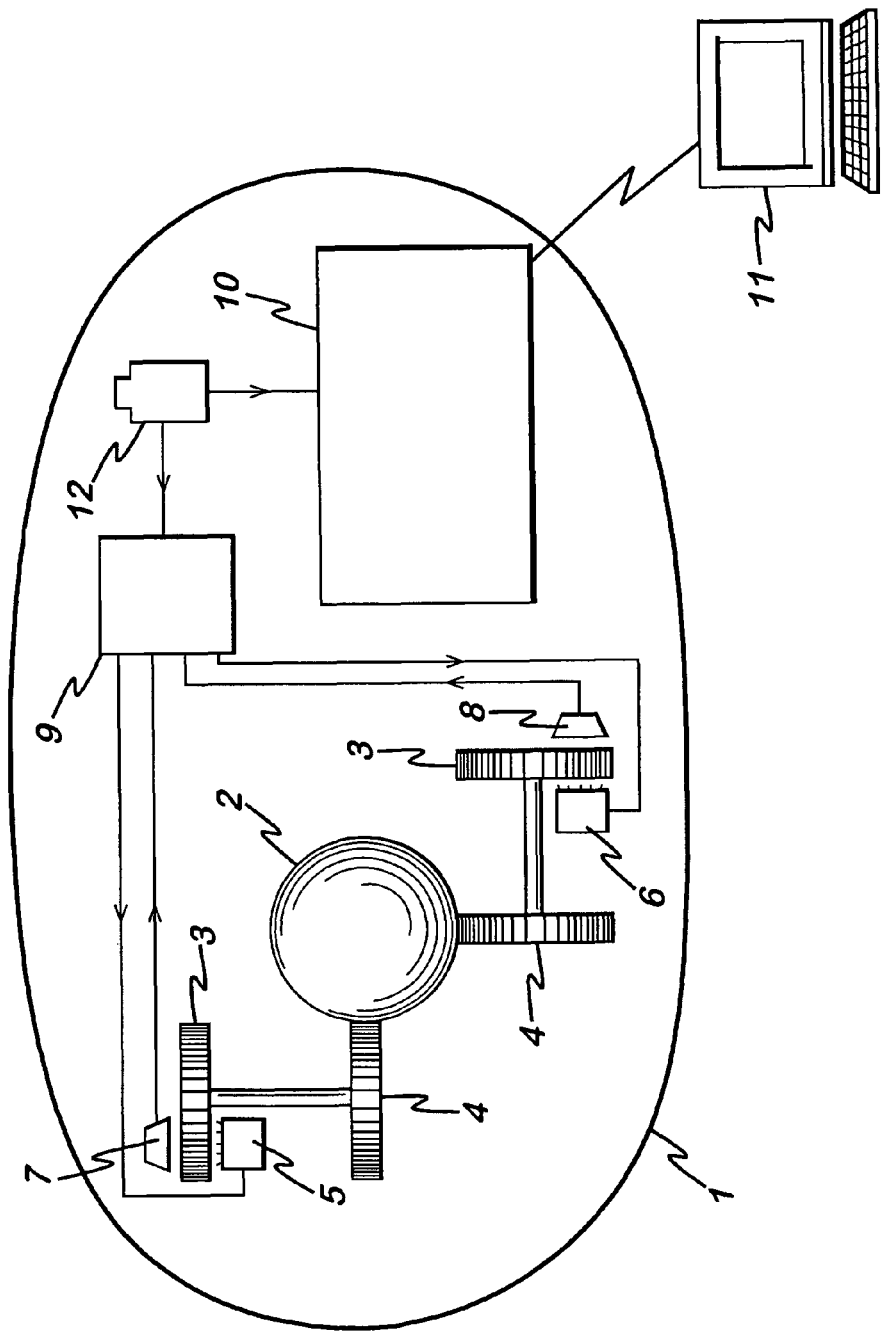

One form of radio-capable device is a wireless computer mouse, as illustrated in FIG. 1. The mouse comprises a housing 1 arranged for sliding movement across a surface such as a table top. Inside the housing is a ball 2 which is held captive so that it rotates as the mouse is slid. Spoked wheels 3 are axially linked to tracking wheels 4 which bear against the ball 2 so that the spoked wheels rotate as the ball is moved. A pairing of an optical emitter 5, 6 and receiver 7, 8 is arranged across the spoked wheel. When the ball rotates, the corresponding motion of spokes of the spoked wheels interrupts optical beams from the emitters 5, 6, and this is detected at the receivers 7, 8. The output of the receivers passes to a control unit 9, which uses the output to estimate the sliding motion of the housing 1. The control unit transmits information on this motion to a radio transceiver 10, which transmits the data to a computer 11. The computer can use the information to set the location of a cursor, for example.

If a mouse is connected to a computer by a cable then it can derive its power from the computer through the cable. However, for a wireless mouse as shown in FIG. 1, this is not possible, so the wireless mouse comprises a battery 12 which powers the components 5 to 10.

Another type of mouse detects motion by means of an optical sensor directed out of the mouse towards the surface on which the mouse is resting. Movement is detected by optically sensing the movement past the sensors of optically contrasting features on the surface. Such a mouse may have means to illuminate the surface to emphasis the contrast.

Since the battery can supply only a limited amount of energy it is important to minimise the power consumption of the mouse. To this end wireless mice typically adopt a low power mode when no movement has been detected for some time: typically after a few minutes. In the low power mode the emitters and receivers 5-8 (or the other receivers and emitters used in other types of mouse) are disabled.

Once in this low power mode the mouse must detect when it is required for use again. This is typically achieved by enabling the emitters and receivers on a low duty cycle, for instance enabling them only once per second for a few milliseconds to check for movement during the time they are enabled. If movement is detected then the mouse is restored to its fully active state. However, this method has the disadvantage that even when they are only enabled on a low duty cycle the optical sensors can make a substantial drain on the battery. A common refinement is to increase the interval between active times as a function of the time since movement was last detected; for example after 30 seconds of inactivity only to look for movement every 100 ms, but after 3 minutes to increase the interval to 1 s and after 30 minutes to increase it again to 5 s.

Another way to detect that the mouse is required for use is by using a capacitive sensor which is sensitive to changes in capacitance when a hand is in contact with the mouse. This has the advantage of reduced power consumption in comparison to the preceding method. However, it requires the capacitive sensor to be built into the mouse, which increases manufacturing costs.

Similar considerations apply to other wireless devices than mice.

There is a need for an improved way to detect when such devices may be required for use.

According to the present invention there is provided a radio-capable device, comprising: a data collection unit for collecting data, and having a normal operating mode in which it is enabled for collecting data and a low-power mode; a radio communication unit for transmitting over a radio channel data collected by the data collection unit; and a radio channel sensor coupled to the radio unit for sensing at least one physical characteristic of the radio channel, and arranged to cause the data collection unit to enter the normal operating mode if the physical characteristic meets a pre-set threshold.

Preferably the data collection unit is capable of collecting user inputs. For example, the data collection unit could include an input sensor (e.g. an optical sensor) for sensing movement of the device relative to a surface external to the device and/or a keypad and/or a touch-sensitive surface (e.g. a touch-sensitive display screen). When the device is in the low-power mode the input sensor is preferably restricted in its operation: for example it could operate on a reduced duty cycle compared to the normal operating mode, or it could be entirely disabled in the low-power mode. The radio channel sensor itself is preferably arranged to sense the said characteristic by means of at least one antenna of the radio communication unit. Thus the radio channel sensor may be integrated with the radio communication unit. For instance, the radio channel sensor may employ hardware of the radio communication unit to perform its function. Where one or more antennas of the radio communication unit are connected to processing hardware that can execute instructions to perform decoding of received signals, that same processing apparatus can preferably also execute instructions to sense the said characteristic. Such instructions are preferably stored on a data store of the radio-capable device. Transmission of the user data over the channel may be suspended or carried out less often when the sensor is in its low-power mode.

The physical characteristic is suitably the tendency of the channel to return to the radio communication unit radio signals transmitted by the radio communication unit. The characteristic could be one or more of: reflection of radio signals transmitted by the device, absorption of signals transmitted to or by the device, and de-tuning of one or more antennas of the device. The radio channel sensor is suitably arranged to cause the data collection unit to enter the normal operating mode if that tendency exceeds a set value, or exceeds a set value on average over a set time. Where the radio communication unit has two antennas (e.g. one for transmission and one for reception) the physical characteristic may be the amount of coupling between the antennas.

In one arrangement the radio communication unit may comprise a transmitter and a receiver which share an antenna and the radio channel sensor is arranged to sense the level of signals transmitted by the transmitter that are received by the receiver. In another arrangement the radio communication unit may comprise a transmitter having a first antenna and a receiver having a second antenna and the radio channel sensor is arranged to sense the level of signals transmitted by the transmitter that are received by the receiver.

The device is preferably a wireless device. The device may be powered by a battery.

The data collection unit may be arranged to enter the low power mode if no substantial input has been received during a period of a pre-set duration.

In its low-power mode the sensor preferably uses less power (averaged over time) than in its normal operating mode. In its low-power mode the sensor is preferably fully or partially disabled in comparison to its normal mode.

The present invention will now be described by way of example with reference to the accompanying drawings.

Figure 2:
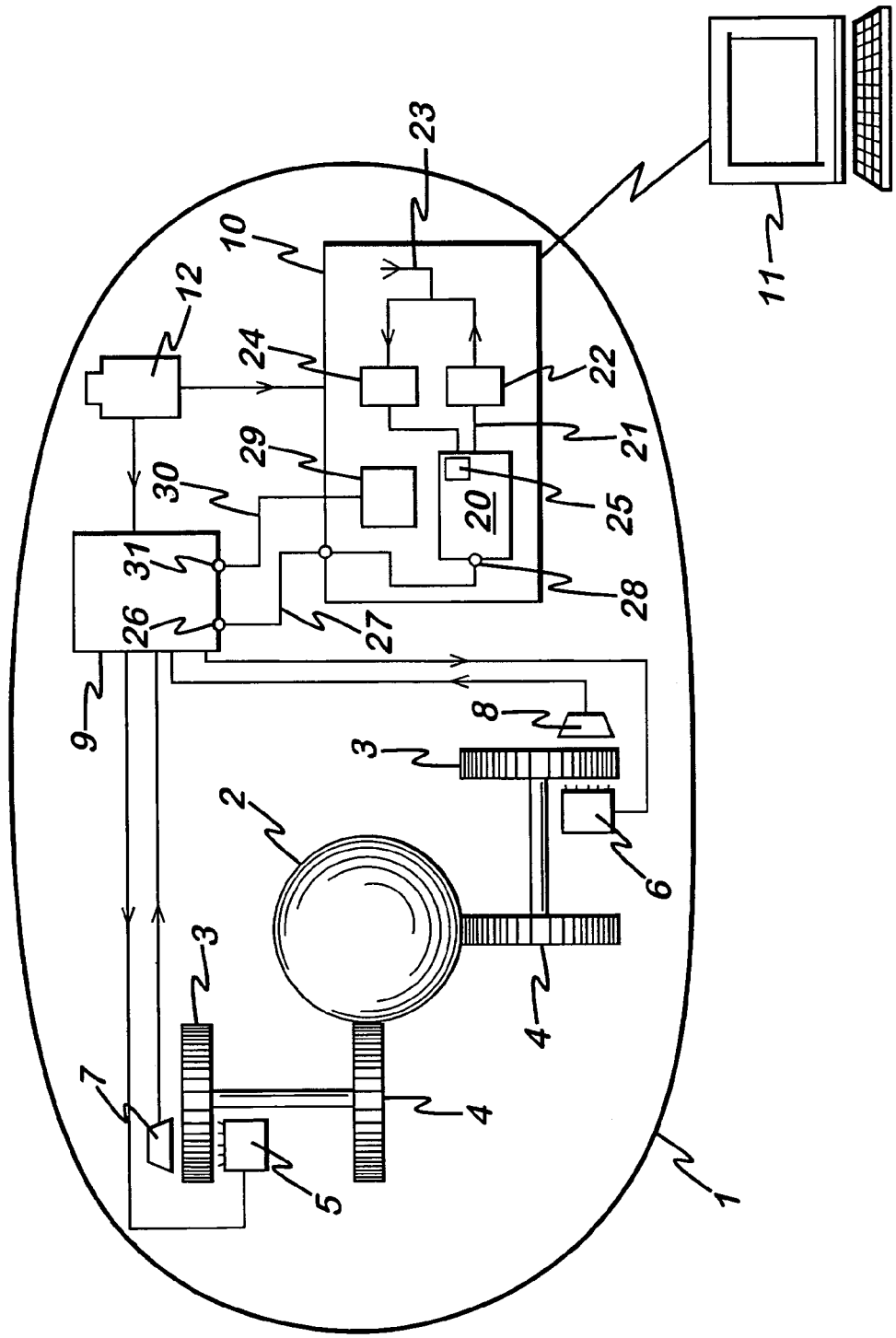

In the drawings:

FIGS. 1 to 3 are schematic diagrams of wireless mice.

In FIGS. 2 and 3 like parts are designated as in FIG. 1.

In the mouse of FIG. 2 the radio transceiver is shown in more detail.

In this example, the transceiver is operable according to a communication protocol in which there is a duplex link (e.g. at the link control level) for supporting the operation of the protocol. Therefore, although at an application level data might flow only in one direction (from the mouse to the computer), the transceiver of the mouse is also capable of receiving signals.

The transceiver comprises a transceiver controller 20 which supervises the maintenance of the communication protocol between the mouse and the computer 11. The transceiver has a transmit output 21 providing signals for transmission, including application data and signals for maintenance of the protocol. The transmit output is connected via a transmit chain 22, which modulates and upconverts the signals, to an antenna 23. Signals received by the antenna are demodulated and if necessary downconverted by a receive chain 24 and then pass to a receive input of the transceiver controller. The transmit controller includes a protocol unit 25 which performs transmit and receive operations as required by the protocol that is used.

Application data for transmission by the transceiver is generated by controller 9 at its data output 26. The application data will include signals indicating the movement or position of the mouse, as derived from sensors 7, 8. Those signals pass over data link 27 to a transmit input 28 of the transceiver controller 20, which causes them to be transmitted to the computer via transmit chain 22 and antenna 23.

The transceiver also has an activity detector 29 which monitors the operation of the transceiver to detect activity that is to cause the mouse to leave a low-power state. When the activity detector detects such activity it signals it via connection 30 to controller 9, and if at that point the device is in a low power state the controller causes it to enter its fully active state. In this embodiment the controller has a dedicated input 31 for receiving indications of activity. The activity controller can also influence the signals transmitted by the transceiver via its connection to the transceiver controller.

The activity detector detects activity by monitoring the receive channel whilst the transceiver is transmitting, to observe the extent to which signals transmitted from the antenna are received back into it. The results of this may be used in a number of ways. One method is for the activity detector to deem that activity has been detected when the level of transmitted signal that is received exceeds a pre-set threshold. Another method is for the activity detector to deem that activity has been detected when the level of transmitted signal that is received changes by more than a pre-set amount in a pre-set time. The primary effects that may cause this change are: reflection, attenuation and proximity detuning. In reflection the receiver antenna is monitored for changes due to the reinforcement or cancellation of the transmitted signal due to nearby objects. The design of the mouse could be chosen to increase the opportunities for reflection in the desired bandwidth. In attenuation received signals are absorbed by a nearby object. In proximity de-tuning the efficiency of the antenna is reduced when there is an object near it, as the presence of the object changes the standing wave ratio (SWR) of the antenna, which directly affects the voltage at the terminals of the transmitter. Proximity detuning is generally the strongest effect where the device has only a single antenna. In each case, a change (reduction or increase or either) in reception of a signal by more than a pre-set amount in a pre-set time is suitably taken to indicate activity.

If no application data is being transmitted over the link between the mouse and the computer then the transceiver may still be transmitting data according to the radio protocol in order to maintain the link. The activity detector may monitor the extent to which the signals carrying that data are received back. Alternatively, if the transceiver would not otherwise be transmitting any signals then the activity detector may control the transceiver to transmit dummy signals so that it can monitor for changes in received signal.

FIG. 3 shows another embodiment. In this embodiment the transceiver has two antennas. One antenna 32 is connected to the transmit chain and one antenna 33 is connected to the receive chain. An arrangement of this type is common in transceivers that operate according to the Bluetooth protocol. In this embodiment the activity detector 29 operates in a similar way to that of FIG. 2, except that it detects the level of coupling between the antennas 32 and 33, and/or changes in the receiver and/or transmitter's characteristics due to reflection, attenuation and/or proximity de-tuning.

The present invention is especially advantageous when applied to mice or trackballs that use optical motion sensors, since the power drain due to the sensors is so high. However, the present invention can usefully be applied to other types of mice and to devices other than mice. Such devices are preferably input devices such as keyboards, joysticks and remote controllers. The invention could be applied to other devices such as notebook computers, PDAs (personal digital assistants) and mobile phones. The present invention is preferably applied to wireless devices. Alternatively it could be applied to wired devices such as desk-top computers, which could be arranged to leave a low-power mode in a similar way, for example in response to a change in radio conditions detected by an on-board Bluetooth unit. Another application is in entry systems and other security apparatus. Such systems may have sensors such as optical fingerprint sensors, and radio communications apparatus for communicating with a control unit to verify a detected fingerprint or other indicia. The sensor could be arranged to leave a low-power mode when nearby activity is detected by means of the radio communications apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A radio-capable device, comprising:
a data collection unit for collecting data, and having a normal operating mode, in which it is enabled for collecting data, and a low-power mode; a radio communication unit for transmitting over a radio channel data collected by the data collection unit; and
a radio channel sensor coupled to the radio communication unit for sensing at least one physical characteristic of the radio channel, and arranged to cause the data collection unit to enter the normal operating mode if the physical characteristic meets a pre-set threshold.

2. A radio-capable device as claimed in claim 1, wherein the radio channel sensor is arranged to sense the said characteristic by means of at least one antenna of the radio communication unit.

3. A radio-capable device as claimed in claim 1, wherein the data collection unit is capable of collecting user inputs.

4. A radio-capable device as claimed in claim 3, wherein the data collection unit comprises an optical sensor for sensing movement of the device relative to a surface external to the device.

5. A radio-capable device as claimed in claim 4, wherein the optical sensor is fully or partially disabled in the low-power mode.

6. A radio-capable device as claimed in claim 3, wherein the device is a mouse or a trackball.

7. A radio-capable device as claimed in claim 1, wherein the physical characteristic is the tendency of the channel to return to the radio communication unit radio signals transmitted by the radio communication unit.

8. A radio-capable device as claimed in claim 7, wherein the radio communication unit comprises a transmitter and a receiver which share an antenna and the radio channel sensor is arranged to sense the level of signals transmitted by the transmitter that are received by the receiver.

9. A radio-capable device as claimed in claim 8, wherein the characteristic is a change in the sensed level.

10. A radio-capable device as claimed in claim 9, wherein the characteristic is a change in the sensed level of greater than a pre-set amount in a pre-set time.

11. A radio-capable device as claimed in claim 7, wherein the radio communication unit comprises a transmitter having a first antenna and a receiver having a second antenna and the radio channel sensor is arranged to sense the level of signals transmitted by the transmitter that are received by the receiver.

12. A radio-capable device as claimed in claim 1, wherein the physical characteristic is one or more of reflection of radio signals transmitted by the device, absorption of signals transmitted to or by the device, and de-tuning of one or more antennas of the device.

13. A radio-capable device as claimed in claim 1, wherein the device is a wireless device.

14. A radio-capable device as claimed in claim 1, wherein the device is powered by a battery.

15. A radio-capable device, comprising:
   a data collection unit for collecting data, and having a normal operating mode in which it is enabled for collecting data, and a low-power mode;
   a radio communication unit for transmitting over a radio channel data collected by the data collection unit; and
   a radio channel sensor coupled to the radio communication unit for sensing a change in at least one physical characteristic of the radio channel that is indicative of use of the device by a user, and arranged to cause the data collection unit to enter the normal operating mode from the low-power mode upon sensing of said change.

16. A radio-capable device as set forth in claim 15, wherein said change in at least one physical characteristic comprises a change in received signal level.

17. A radio-capable device as set forth in claim 15, wherein said change in at least one physical characteristic comprises a change in received signal level by more than a predetermined amount.

18. A radio-capable device as set forth in claim 15, wherein said change in at least one physical characteristic comprises a change in received signal level by more than a predetermined amount within a predetermined time.

19. A radio-capable device as set forth in claim 15, wherein said radio channel sensor further controls said radio communication unit to transmit dummy signals over said radio channel when said device is in said low-power mode.

20. A wireless device having a normal operational mode and a low-power standby mode, comprising:
   a transceiver capable of transmitting and receiving signals over a wireless communication channel; and
   a wireless communication channel sensor coupled to the transceiver for sensing a change in at least one physical characteristic of signals received over the wireless channel that is indicative of use of the device by a user, and arranged to cause the wireless device to enter the normal operational mode from the low-power mode upon sensing of said change.

* * * * *